United States Patent [19]

Sano

[11] Patent Number: 5,038,296
[45] Date of Patent: Aug. 6, 1991

[54] AUTOMATIC PROGRAM SYNTHISIZER

[75] Inventor: Yasuko Sano, Musashimurayama, Japan

[73] Assignee: Kabushiki Kaisha Toshiba, Kawasaki, Japan

[21] Appl. No.: 503,924

[22] Filed: Apr. 4, 1990

[30] Foreign Application Priority Data

Apr. 4, 1989 [JP] Japan .................................. 1-85351

[51] Int. Cl.$^5$ .............................................. G06F 1/00
[52] U.S. Cl. .................... 364/513; 364/200; 364/900; 381/101
[58] Field of Search ............ 364/200, 900, 513; 381/51, 36, 101

[56] References Cited

U.S. PATENT DOCUMENTS

| | | | |
|---|---|---|---|
| 4,458,362 | 7/1984 | Berkovitz et al. | 381/101 |
| 4,713,775 | 12/1987 | Scott et al. | 364/513 |
| 4,819,160 | 4/1989 | Tanka et al. | 364/200 |

Primary Examiner—Allen R. MacDonald
Assistant Examiner—George Davis
Attorney, Agent, or Firm—Oblon, Spivak, McClelland, Maier & Neustadt

[57] ABSTRACT

An automatic program synthesizer is disclosed. The synthesizer comprises program rule memory for storing a program synthesis rule, program synthesis goal generator for generating a program synthesis goal suitable for system specifications of a target system by using the program synthesis rule, program generator for generating a retrieval condition on the basis of the program synthesis goal, the retrieval condition being a condition for retrieving variables having the same attribute, variable attribute memory for storing a variable name and the variable attribute, interpolation program synthesis rule memory for storing an interpolation program synthesis rule for generating an interpolation program, and variable attribute manager for receiving the retrieval condition from the program generator and for controlling the variable attribute memory to retrieve a variable name and sending a retrieved variable name to the program generator upon reception of the retrieval condition, the program generator generating a partial program by using the retrived variable name, the variable attribute manager controlling the interpolation program synthesis rule memory to generate an interpolation program synthesis goal for changing an attribute by using a variable having some different attributes in accordance with the interpolation program synthesis rule stored in the interpolation program synthesis rule memory and sending the interpolation program synthesis goal to the program generator, and the program generator generating the interpolation program by using the interpolation program synthesis goal.

6 Claims, 8 Drawing Sheets

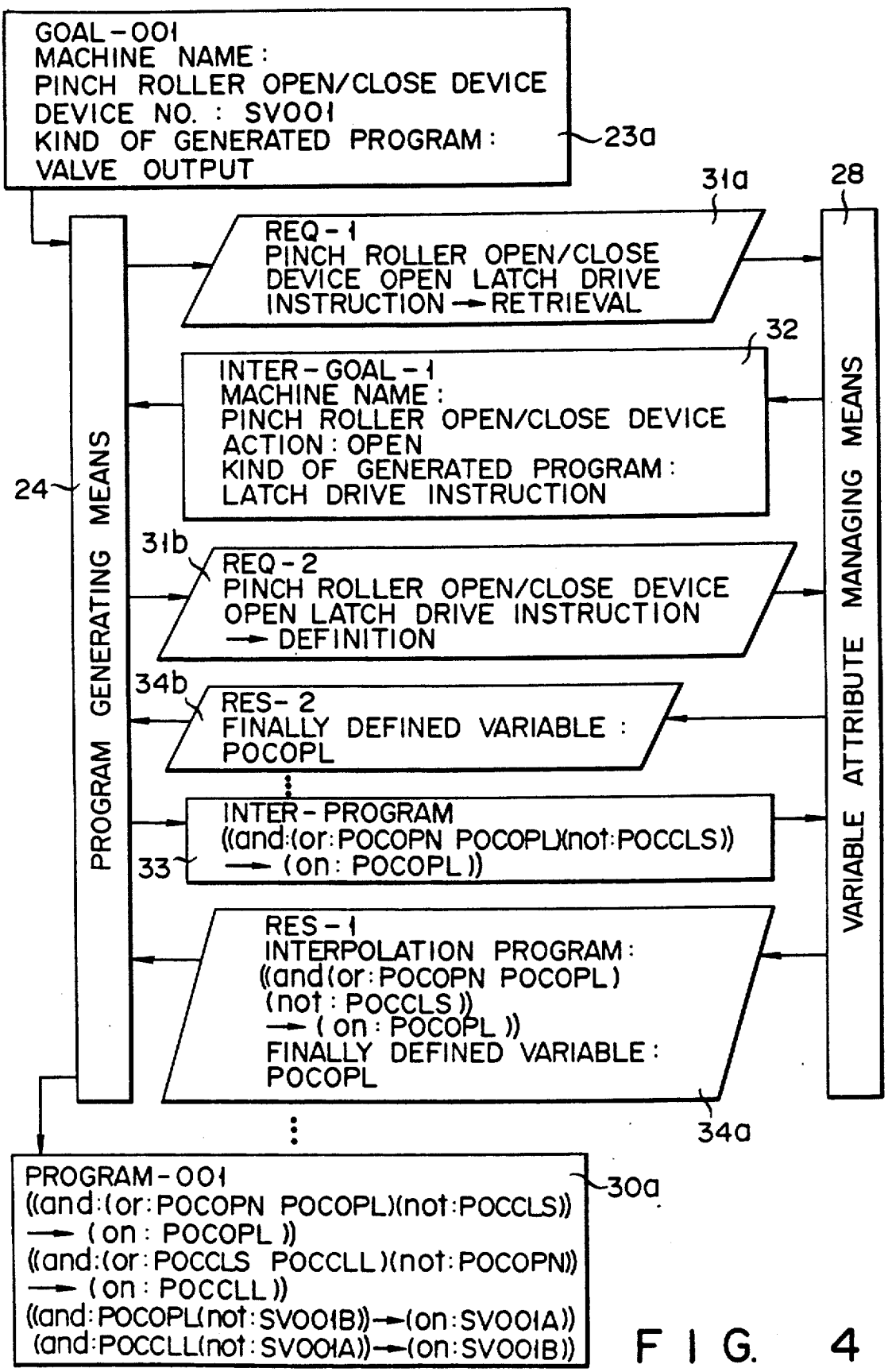
F I G. 4

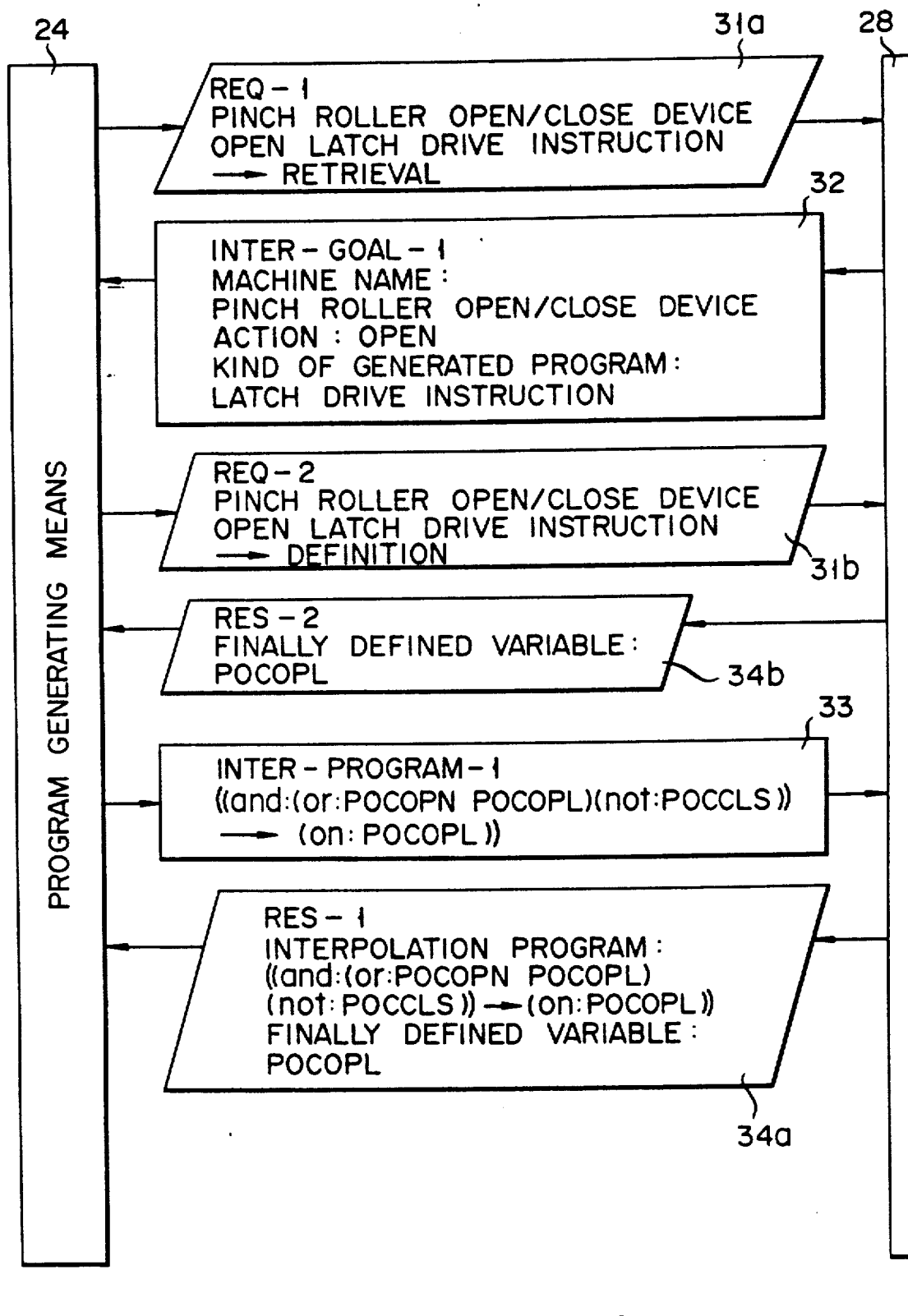
F I G. 5A

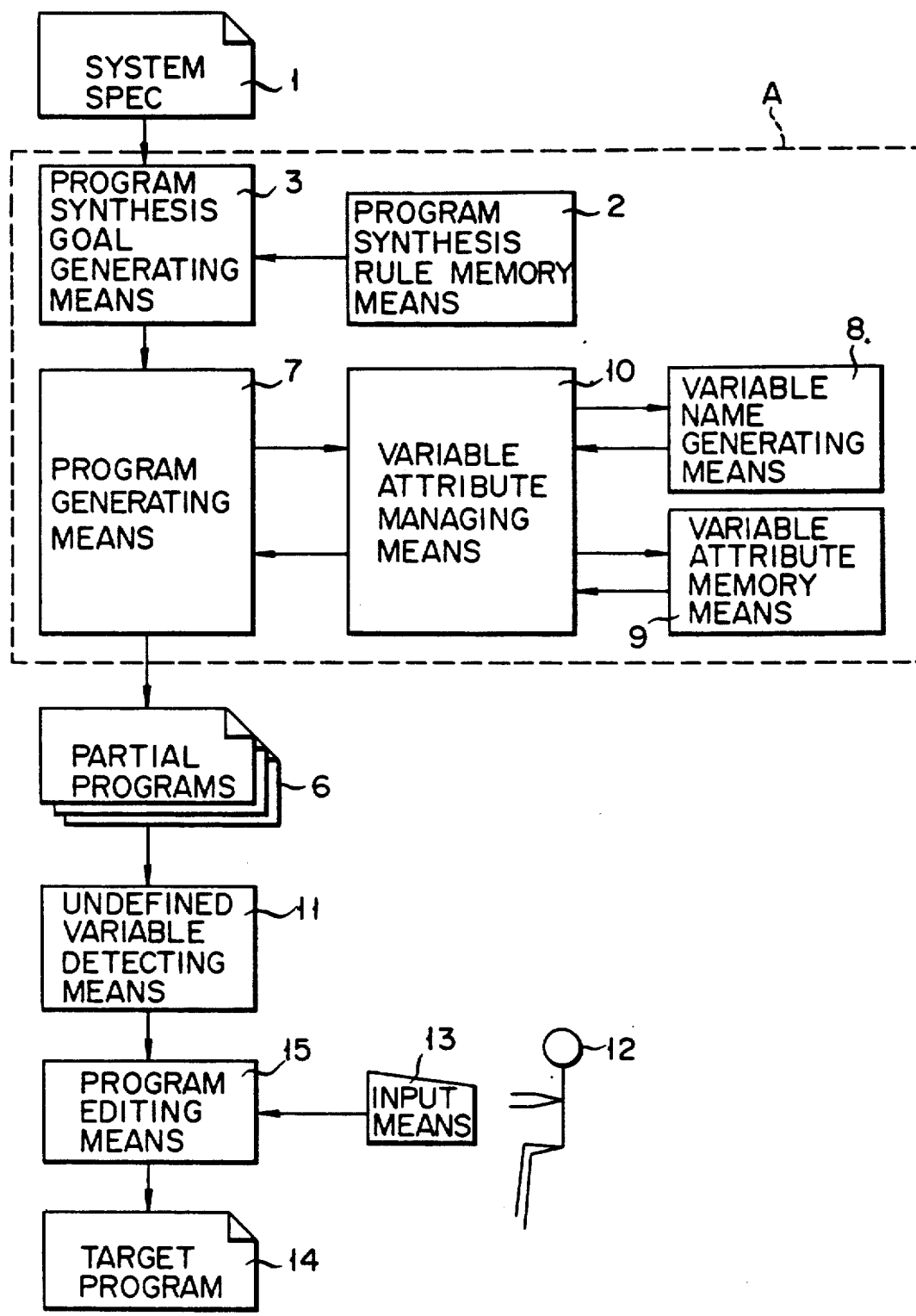
(PRIOR ART) FIG. 6

AUTOMATIC PROGRAM SYNTHISIZER

BACKGROUND OF THE INVENTION

1. Field of the Invention

The present invention relates to an automatic program synthesizer for automatically generating a program suitable for system specifications of a target system, e.g., a plant control system and, more particularly, to an automatic program synthesizer for generating an interpolation program for interpolating a plurality of partial programs.

2. Description of the Related Art

A conventional program synthesizer has been developed to generate a synthetic program as a set of partial programs by simultaneously managing variables and constants used in a plurality of partial programs and standardizing names of variables and constants having identical definitions.

FIGS. 6 and 7 are block diagrams showing schematic and detailed arrangements of a conventional program synthesizer system. The conventional program synthesizer system comprises a system specification input means 1 for inputting system specifications and an automatic program synthesizer A for automatically synthesizing a program suitable for the system specifications input from the system specification input means 1.

The automatic program synthesizer A comprises a program synthesis rule memory means 2, a program synthesis goal generating means 3, a program generating means 7, a variable name generating means 8, a variable attribute memory means 9, and a variable attribute managing means 10. The program synthesis rule memory means 2 stores program synthesis rules. The program synthesis goal generating means 3 refers to the program synthesis rules and generates a program synthesis goal 3a on the basis of the specifications input from the system specification input means 1. The program generating means 7 defines attributes of variables used in the program on the basis of the program synthesis goal 3a received from the program synthesis goal generating means 3. The program generating means 7 generates so-called definition/retrieval conditions 4 of variable attributes which represent condition for retrieving variables having the same attributes, generates a variable name 5 actually used in the program on the basis of the definition conditions or retrieval conditions, and generates a partial program 6. The variable attribute managing means 10 causes the variable name generating means 8 to generate a new variable name and stores in the variable attribute memory means 9 the variable name generated by the variable name generating means 8 and the attribute designated by the definition/retrieval conditions 4 of variable attributes when the condition received from the program generating means 7 is the definition condition. When the condition received from the program generating means 7 represents the retrieval condition, the variable attribute managing means 10 retrieves a name of a variable having the attribute designated by the definition/retrieval conditions 4 of variable attributes from the variable attribute memory means 9 and sends back the retrieved name to the program generating means 7.

An undefined variable detecting means 11, an input means 13, and a program editing means 15 are arranged as means for manually synthesizing a plurality of partial programs 6. The undefined variable detecting means 11 detects an undefined variable 11a in the partial program 6 generated by the program generating means 7. A designer 12 uses the input means 13 to input an interpolation program for generating an undefined variable on the basis of the undefined variable 11a. By using the program editing means 15, a synthetic program 14 obtained by synthesizing the plurality of partial programs is generated by using the interpolation program input from the input means 13.

In order to generate the synthetic program 14 by synthesizing several partial programs 6 in the conventional program synthesizer, the names of variables of the partial programs 6 in which variables (including constants) used in the individual partial programs 6 have identical attributes must be standardized to synthesize the partial programs.

In the above synthesizer system, when the definitions of the variables do not perfectly match with each other, a plurality of partial programs 6 cannot be synthesized. For this reason, the undefined variable detecting means 11 is arranged to detect the undefined variable 11a from the nonsynthesized portion of the programs 6. The designer 12 corrects the partial programs 6 while referring to the undefined variables 11a or adds an interpolation program to obtain a finally synthesized program 14.

It takes a long period of time for the designer 12 to generate the interpolation program. It also takes a long period of time to obtain a perfectly synthetic program 14 suitable for the system specifications. Therefore, program synthesis efficiency is low in the conventional system.

SUMMARY OF THE INVENTION

It is an object of the present invention to provide an automatic program synthesizer capable of automatically and easily generating an interpolation program without requiring manual operations, generating a synthetic program at high speed, and greatly contributing to energy savings in program generation.

A first automatic program synthesizer according to the present invention comprises: a program synthesis rule memory means, a program synthesis goal generating means, a program generating means, a variable attribute memory means, an interpolation program synthesis rule memory means, and a variable attribute managing means.

The program synthesis rule memory means stores program synthesis rules. The program synthesis goal generating means generates a program synthesis goal suitable for system specifications of a target system by using the program synthesis rules. The program generating means generates retrieval conditions on the basis of the program synthesis goal. The retrieval conditions ar conditions for retrieving variables having identical attributes. The variable attribute memory means stores names and attributes of variables. Interpolation program synthesis rules for generating the interpolation program are stored in the interpolation program synthesis rule memory means. The variable attribute managing means receives the retrieval conditions from the program generating means. The variable attribute managing means controls the variable attribute memory means to retrieve a name of a variable having an attribute suitable for the attribute of the retrieval conditions from the variable attribute memory means and sends the retrieved variable name to the program generating means. The program generating means generates a partial program by using the retrieved variable name.

When the variable name having the attribute which coincides with the attribute of the retrieval conditions cannot be retrieved from the variable attribute memory means, the variable attribute managing means controls the interpolation program synthesis rule memory means to generate an interpolation program synthesis goal for changing the attribute by using a variable having some different attributes in accordance with the interpolation program synthesis rule stored in the interpolation program synthesis rule memory means and sends the generated interpolation program synthesis goal to the program generating means. The program generating mean generates an interpolation program using the interpolation program generation goal.

A second automatic program synthesizer according to the present invention comprises a program synthesis rule memory means, a program synthesis goal generating means, a program generating means, a variable name generating means, a variable attribute memory means, an interpolation program synthesis rule memory means, and a variable attribute managing means.

The program synthesis rule memory means stores program synthesis rules. The program synthesis goal generating means generates a program synthesis goal suitable for system specifications of a target system by using the program synthesis rule. The program generating means generates definition/retrieval conditions of a variable attribute on the basis of the program synthesis goal. The definition/retrieval conditions of a variable attribute are represented by definition conditions for defining attributes of variables (including constants) or retrieval conditions for retrieving variables having the same attributes. The variable name generating means generates variable names. The variable attribute memory means stores the variable names and the variable attributes. The interpolation program synthesis rule memory means stores an interpolation program synthesis rule for generating an interpolation program. The variable attribute managing means receives the definition/retrieval conditions of the variable attributes from the program generating means. When the definition/retrieval conditions of the variable attributes represent the definition conditions, the variable attribute managing means controls the variable name generating means to generate a variable name matching with the definition conditions and stores the variable name matching with the definition conditions and attributes given as the definition conditions in the variable attribute memory means. When the definition/retrieval conditions of the variable attributes are retrieval conditions, the variable attribute managing means controls the variable attribute memory means to retrieve a variable name having an attribute coinciding with that of the retrieval conditions from the variable attribute memory means and sends the retrieved variable name to the program generating means. The program generating means generates a partial program using the retrieved variable name. When the definition/retrieval conditions of the variable attributes are retrieval conditions, and the variable attribute managing means cannot retrieve a name of any variable having an attribute coinciding with that of the retrieval conditions, the variable attribute managing means controls the interpolation program synthesis rule memory means to generate an interpolation program synthesis goal for changing an attribute by using a variable having some different attributes in accordance with the interpolation program synthesis rule stored in the interpolation program synthesis rule memory means. The interpolation program synthesis goal is sent to the program generating means. The program generating means generates an interpolation program by using the interpolation program synthesis goal.

The present invention comprises the means described above. The program synthesis goal generating means generates some program synthesis goals suitable for the system specifications by using the program synthesis rule. This program synthesis goal is a rule for determining a type of program to be generated. After generation of the goals, these goals are sent to the program generating means. The program generating mean generates variable attributes required in the partial programs as the definition or retrieval conditions of variable attributes on the basis of the program synthesis goals and outputs the conditions to the variable attribute managing means. When the variable attribute managing means receives the definition conditions from the program generating means, it generates and sends a new variable name to the variable name generating means. Thereafter, the variable attribute managing means stores this variable name and its attributes in the variable attribute memory means. However, when the variable attribute managing means receives the retrieval conditions, it retrieves a name of a variable from the variables stored in the variable attribute memory means and sends the retrieved variable name to the program generating means. The program generating means generates a partial program suitable for the system specifications by combining this variable name with an operator.

When a name of a variable having a given attribute is to be retrieved, this variable name is not often stored in the variable attribute memory means.

In order to cope with the above situation, the interpolation program synthesis rule as a knowledge for generating an interpolation program is stored in the interpolation program synthesis rule memory means. When the name of the variable having the given attribute is not stored in the variable attribute memory means, the variable attribute managing means generates an interpolation program synthesis goal for changing the attribute by using a variable having some different attributes and sends it to the program generating means. The program generating means generates an interpolation program from this interpolation program synthesis goal and sends the generated program to the variable attribute managing means again. The variable attribute managing means sends back to the program generating means the generated interpolation program as an interpolation program corresponding to the name of the variable which could not be initially retrieved. The program generating means generates a synthetic program such that the partial programs are interpolated by using this interpolation program.

As described above, according to the present invention, manual operations by the designer can be eliminated, an interpolation program can be easily generated, and a synthetic program can be generated at high speed. Therefore, energy savings and high efficiency in program generation can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 4, 5A and 5B are views for explaining exchange of various data between the program generating means and the variable attribute managing means;

FIG. 6 is a block diagram showing a conventional automatic program synthesizer system.

DETAILED DESCRIPTION OF THE PREFERRED EMBODIMENT

Figure 1:
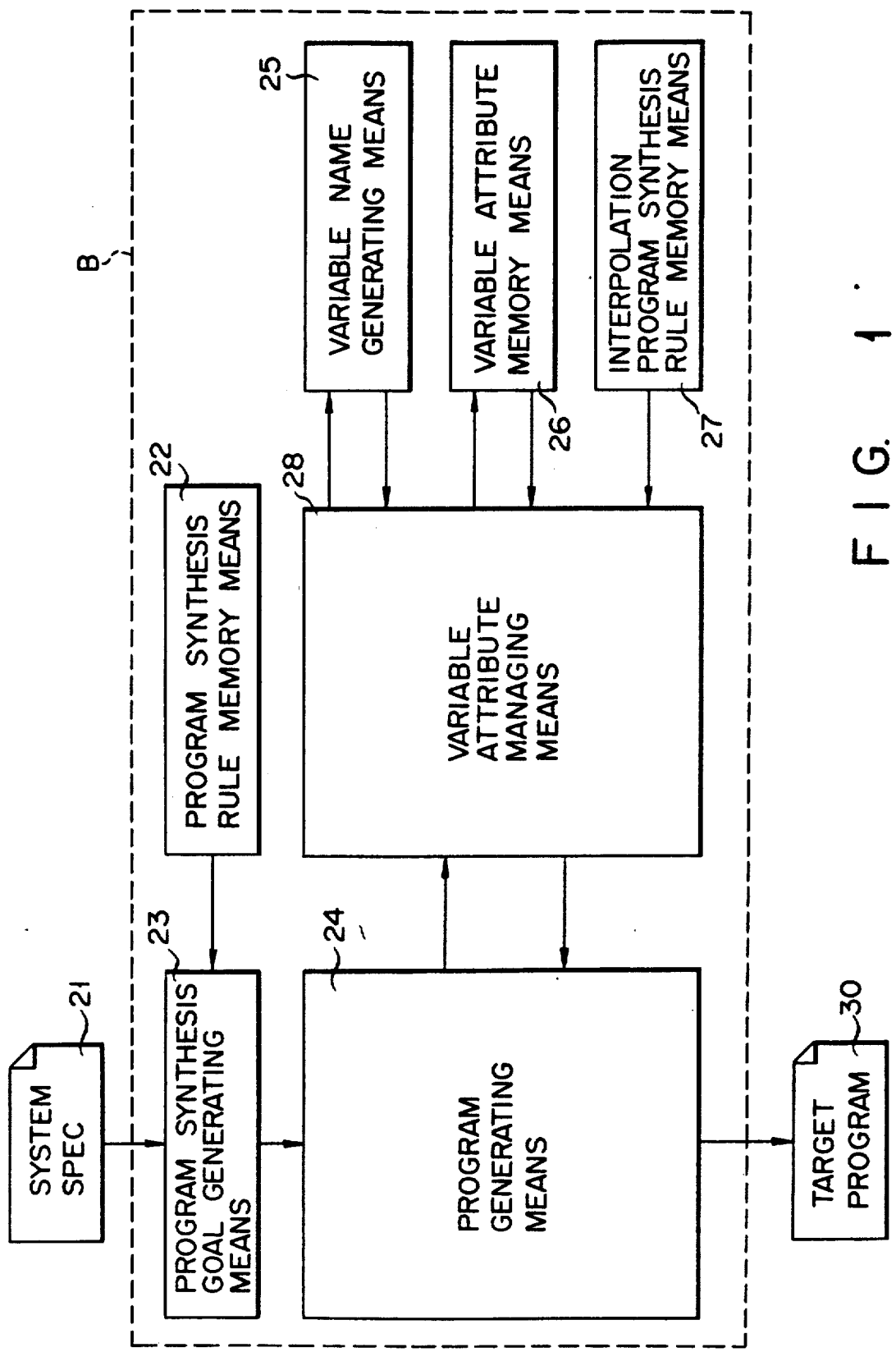
FIG. 1 is a block diagram showing a automatic program synthesizer according to an embodiment of the present invention.

A preferred embodiment of the present invention will be described with reference to FIG. 1. Referring to FIG. 1, reference numeral 21 denotes a system specification input means. The system specification input means comprises a keyboard, an optical character reader, or the like. The system specification input means converts the system specifications of, e.g., a program design system into predetermined data and inputs the data to an automatic program synthesizer B.

The automatic program synthesizer B automatically generates a program suitable for the system specifications input from the system specification input means 21. The automatic program synthesizer B comprises a program synthesis rule memory means 22, a program synthesis goal generating means 23, a program generating means 24, a variable name generating means 25, a variable attribute memory means 26, an interpolation program synthesis rule memory means 27, and a variable attribute managing means 28. The program synthesis rule memory means 22 stores program synthesis rules beforehand based on knowledge engineering. The program synthesis rules constitute, e.g., a knowledge base. The program synthesis goal generating means 23 generates a program synthesis goal with reference to the program synthesis rules on the basis of the specifications input from the system specification input means 21. The program generating means 24 generates so-called definition/retrieval conditions of variable attributes on the basis of the program synthesis goals received from the program synthesis goal generating means 23. The definition/retrieval conditions of the variable attributes represent conditions for defining attributes of variables required in the program or conditions for retrieving variables having the same attributes. The program generating means 24 generates partial programs, while obtaining variable names actually used in the program, on the basis of the definition or retrieval conditions. The variable name generating means 25 generates variable names. The variable attribute memory means 26 stores variable names generated by the variable name generating means 25 and the attributes represented by the definition/retrieval conditions of the variable attributes. The interpolation program synthesis rule memory means 27 stores interpolation program synthesis rules as a knowledge for generating an interpolation program. The variable attribute managing means 28 systematically manages the variable attributes and the variable names used in the partial programs.

When the conditions received from the program generating means 24 are definition conditions, the variable attribute managing means 28 causes the variable name generating means 25 to generate a new variable name and stores the variable name generated by the variable name generating means 25 and the attributes represented by the definition/retrieval conditions of the variable attributes in the variable attribute memory means 26. When the conditions received from the program generating means 24 are retrieval conditions, the variable attribute managing means 28 retrieves a name of a variable having the attributes represented by the definition/retrieval conditions of the variable attributes from the variable attribute memory means 26 and sends back the retrieved variable name to the program generating means 24. When the variable attribute managing means 28 retrieves the variable having the attribute of the retrieval conditions and this variable is not stored in the variable attribute memory means 26, the variable attribute managing means 28 generates an interpolation program synthesis goal on the basis of the interpolation program synthesis rules stored in the interpolation program synthesis rule memory means 27. The variable attribute managing means 28 sends the interpolation program synthesis goal to the program generating means 24 and causes the means 24 to generate an interpolation program. Reference numeral 30 denotes a synthetic program obtained by synthesizing the partial programs.

Figure 2:
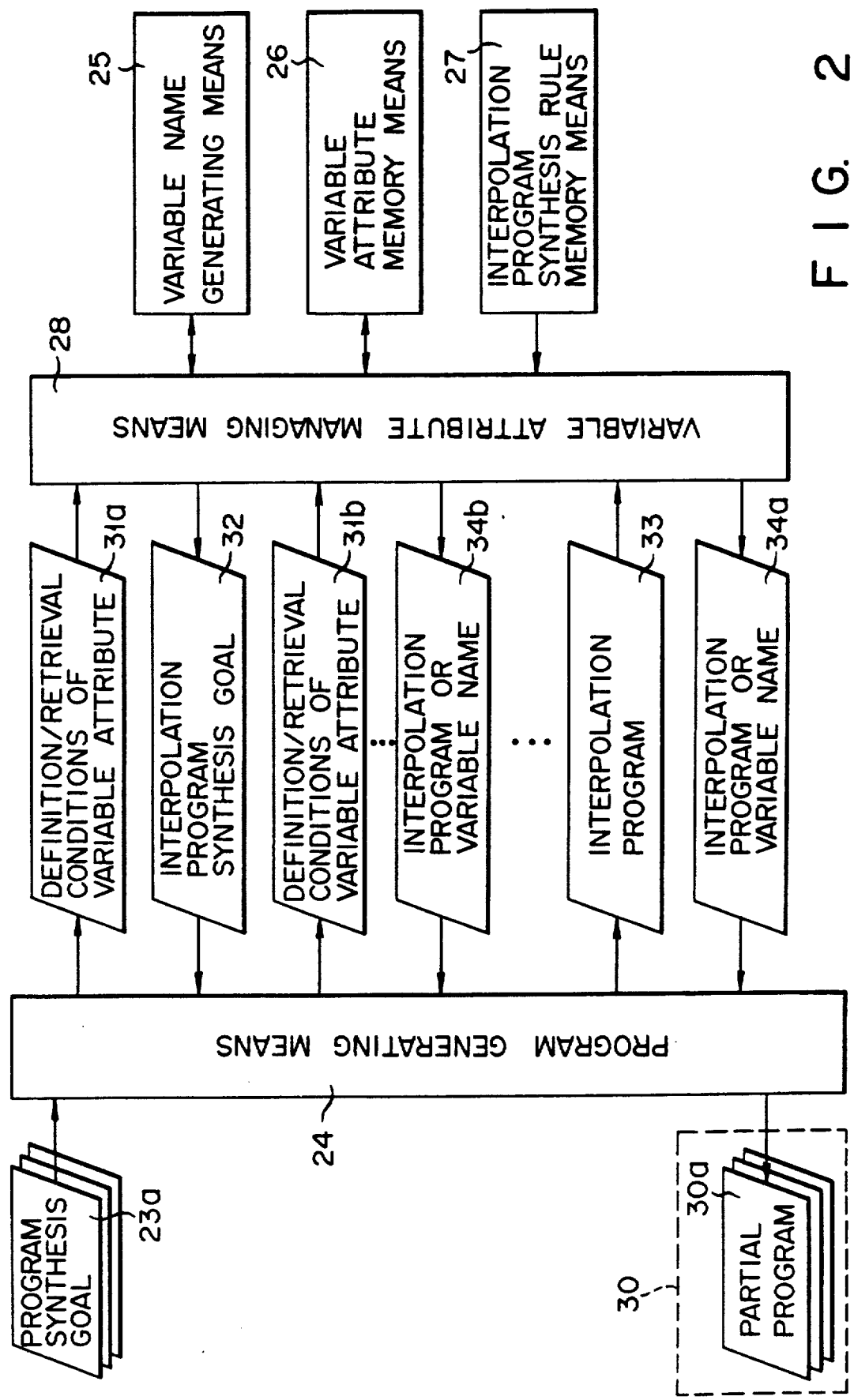
FIG. 2 is a view for explaining exchange of various data between a program generating means and a variable attribute managing means.

Data transfer during generation of a program by the program generating means 24 upon generation of a program synthesis goal will be described with reference to FIG. 2. When the program generating means 24 receives a program synthesis goal 23a from the program synthesis goal generating means 23, it generates a program in accordance with a predetermined technique. The technique may be a method of developing a prototype of a program as a software component and generating a target program, a method of generating a program on the basis of detailed specifications such as flow charts, or a method of generating a program on the basis of a specification descriptive language defined as a high-level metalanguage. By using any one of the methods, the program generating means 24 generates definition/retrieval conditions 31a of variable attributes in order to obtain all variables (including constants) used in a partial program o variables (including constants) associated with another partial program. The definition/retrieval conditions 31a are conditions for defining attributes of variables used in a program to be generated or conditions for retrieving variables having the same attributes. Thereafter, in order to obtain a variable suitable for these conditions, the program generating means 24 requests retrieval to the variable attribute managing means 28.

The variable attribute managing means 28 discriminates a kind of the definition/retrieval conditions 31a of the variable attributes received from the program generating means 24. If the conditions represent definition conditions, the variable attribute managing means 28 generates a variable name suitable for the definition conditions by using the variable name generating means 25 and at the same time stores the generated variable name and the attribute given as the definition conditions in the variable attribute memory means 26. If the conditions 31a are retrieval conditions, the variable attribute managing means 28 retrieves a variable name having the attribute suitable for the retrieval conditions from the variable attribute memory means 26.

When the desired variable name cannot be retrieved by the variable attribute managing means 28 although the conditions 31a are retrieval conditions, the variable attribute managing means 28 generates an interpolation program synthesis goal 32 in accordance with the interpolation program synthesis rules stored in the interpolation program synthesis rule memory means 27 and sends it to the program generating means 24.

Upon reception of the interpolation program synthesis goal 32, the program generating means 24 generates a program in accordance with the same technique as in reception of the program synthesis goal 23a and sends it as an interpolation program 33 to the variable attribute managing means 28. That is, the program generating means 24 generates definition/retrieval conditions 31b of variable attributes and sends them to the variable attribute managing means 28 to determine a variable name. The definition/retrieval conditions 31b of the variable attributes represent conditions for defining the attributes of variables used in a program generated as an interpolation program or conditions for retrieving variables having the same attributes. After the variable name is determined, the program generating means 24 generates a program by using an interpolation program or variable name 34b as a response and sends it back to the variable attribute managing means 28 as an interpolation program 33.

The variable attribute managing means 28 sends back an interpolation program or variable name 34b as a response to the definition/retrieval conditions 31a of the variable attributes to the program generating means 24. More specifically, the interpolation program 33 sent back from the program generating means 24 is directly sent back to the program generating means 24 or the variable name finally defined by the interpolation program is sent back. In latter case, the interpolation program is stored as another partial program. The program generating means 24 links by a predetermined operator individual names determined by exchange of data with the variable attribute managing means 28, thereby generating a program. This program is used as as a response to the initially received program synthesis goal 23a and is output as a partial program 30a.

Figure 3:
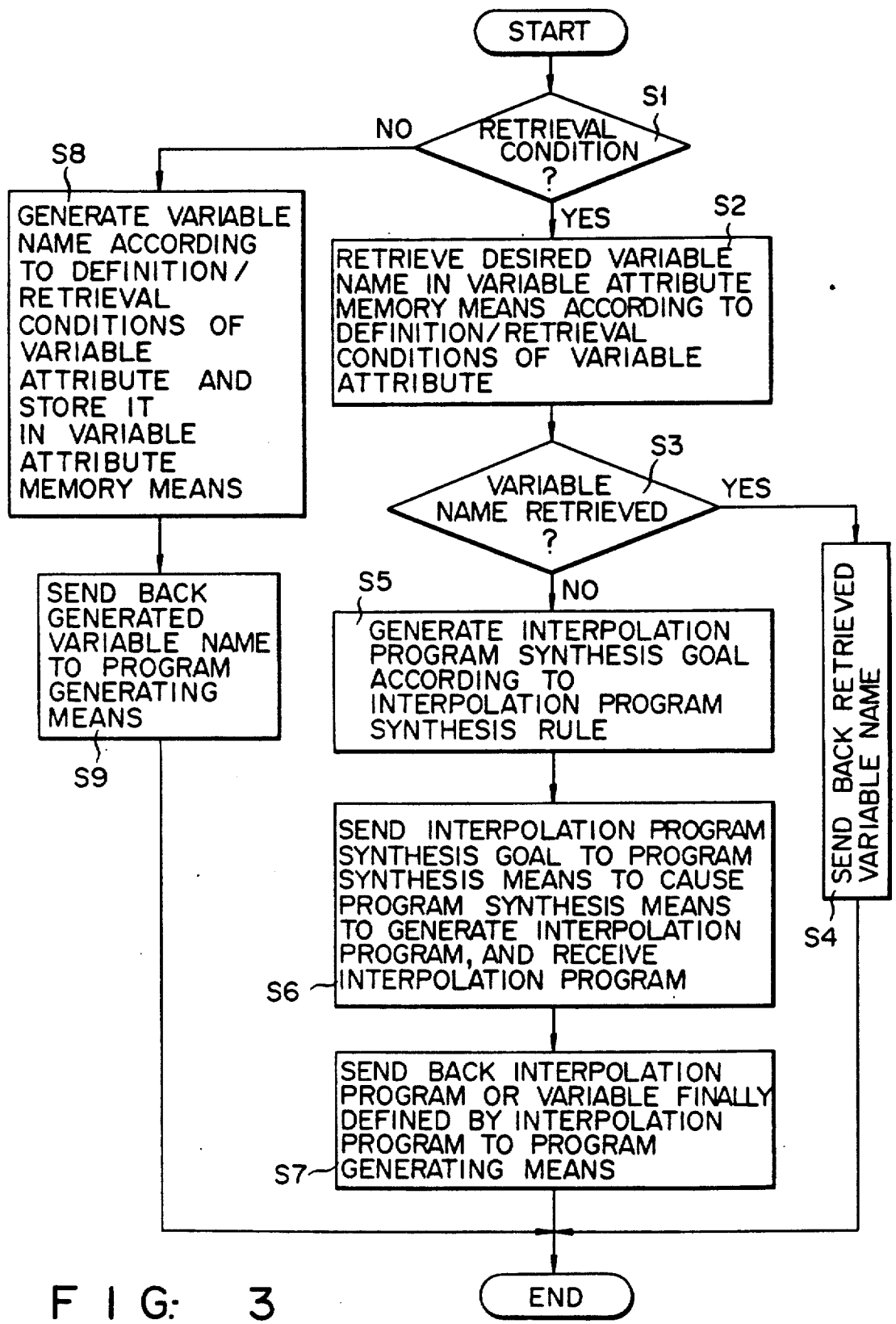
FIG. 3 is a flow chart showing a control sequence of the variable attribute managing means.

Processing of the variable attribute managing means 28 will be described with reference to a flow chart in FIG. 3. More specifically, in step S1, the variable attribute managing means 28 determines whether the definition/retrieval conditions of the variable attributes sent from the program generating means 24 are definition or retrieval conditions. If the conditions are determined as retrieval conditions, the variable attribute managing means 28 determines in step S2 whether a variable name having an attribute suitable for these conditions is stored in the variable attribute memory means 26. The flow then advances to step S3 to determine whether the corresponding variable name is retrieved. If YES in step S3, the variable attribute managing means 28 sends this variable name to the program generating means 24.

However, if NO in step S3, the variable attribute managing means 28 generates an interpolation program synthesis goal in accordance with the interpolation program synthesis rules stored in the interpolation program synthesis rule memory means 27 in step S5. The variable attribute managing means 28 sends this interpolation program synthesis goal to the program generating means 24 to request program generation. The variable attribute managing means 28 then receives the interpolation program as a response to the request for program generation in step S6. Upon reception of the interpolation program from the program generating means 24, the variable attribute managing means 28 sends back this interpolation program or a variable name finally defined by this interpolation program to the program generating means 24 in step S7.

In step S1, however, when the conditions are determined to be definition conditions, the flow advances to step S8. The variable attribute managing means 28 requests generation of a variable name to the variable name generating means 25 on the basis of the variable attribute represented by the definition/retrieval conditions of the variable attributes. When a variable name is generated as a response to it, the variable attribute managing means 28 stores the variable name and the variable attribute of this variable in the variable attribute memory means 26. In step S9, the variable attribute managing means 28 sends back the generated variable name to the program generating means 24. Even if the program generating means 24 cannot retrieve the corresponding variable name from the variable attribute memory means 26 on the basis of the retrieval conditions, the means 24 can generate the interpolation program by using the interpolation program synthesis rules. The program generating means 24 can generate the partial program 30a by using the interpolation program or the variable name defined by this interpolation program. At the same time, the synthetic program 30 can be obtained by synthesizing the partial programs 30a.

Figure 5B:
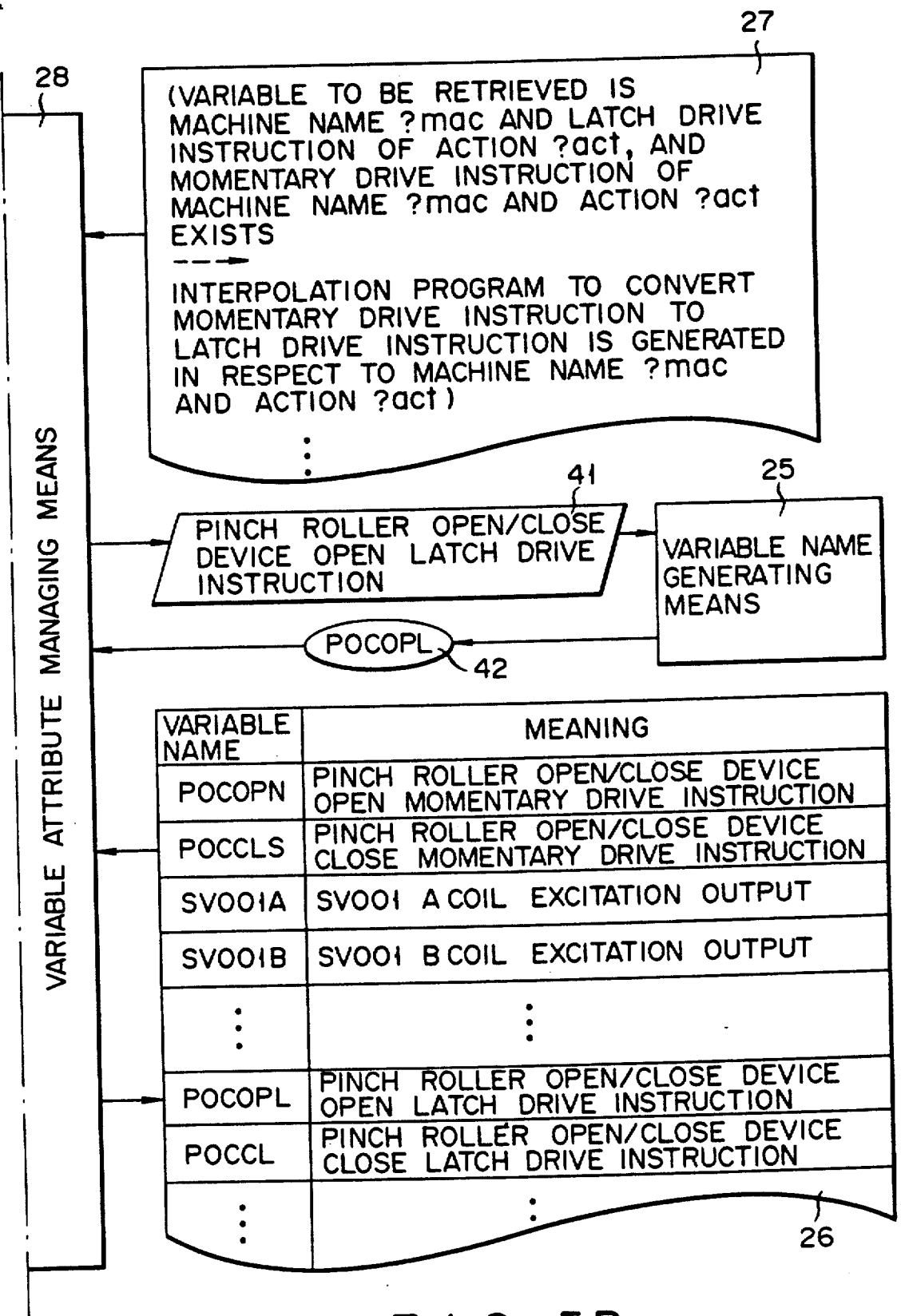
Figure 7:
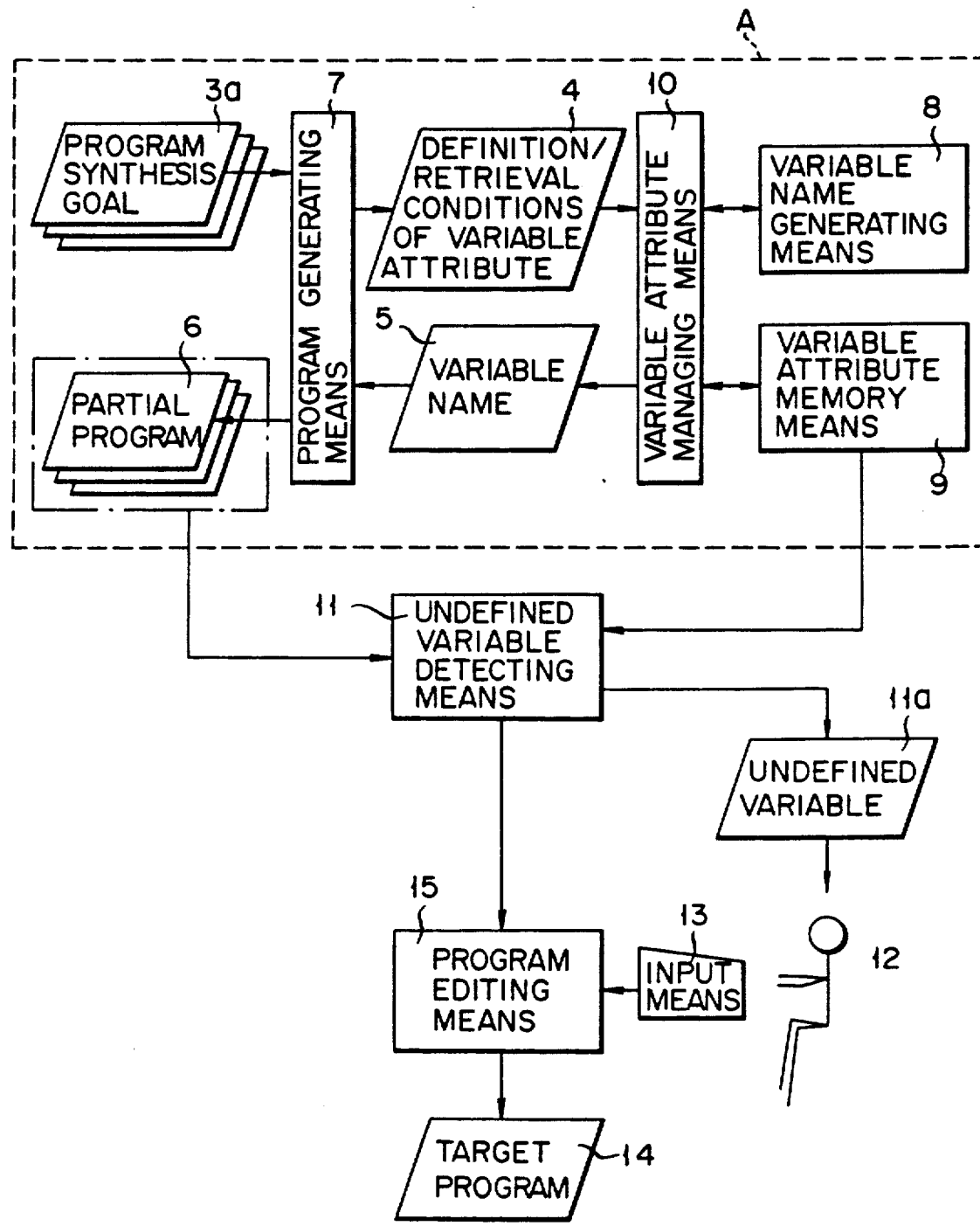
FIG. 7 is a detailed block diagram showing the automatic program synthesizer system shown in FIG. 6.

Data transfer between the program generating mean 24 and the variable attribute managing means 28 will be described in detail with reference to FIGS. 4 and 5.

Assume that a program synthesis goal GOAL-001 (23a in FIG. 2) having the following content is sent from the program synthesis goal generating means 23 to the program generating means 24:

---
"Machine name: Pinch roll open/close device
Device No.: SV001
Kind of Generated Program: Valve Output"

---

Upon reception of this program synthesis goal GOAL-001, the program generating means 24 starts generating a program. In this case, if a variable name required in a program is available, the program generating means 24 generates definition/retrieval conditions REQ-1 (31a in FIG. 2) as follows:

---
"Pinch roll open/close device
Open
Latch
Drive instruction
Retrieval"

---

The program generating means 24 sends the retrieval conditions REQ-1 to the variable attribute managing means 28 and request to obtain a variable name directly required in the program. Upon reception of the retrieval conditions REQ-1, the variable attribute managing means 28 determines whether a variable having the following meanings is stored in the variable attribute memory means 26 in response to the retrieval conditions REQ-1:

"Pinch roll open/close device
Open
Latch
Drive instruction"

When the variable attribute managing means 28 determines that this variable is not stored in the variable attribute memory means 26, an interpolation program synthesis rule for generating this variable is kept searched. Since the following variable is available in interpolation program synthesis rule memory means 27:

"Variable to be retrieved is machine name ?mac
and latch drive instruction of action ?act, and
momentary drive instruction of machine name ?mac
and action ?act exists"
→
Interpolation program to convert momentary drive
instruction to latch drive instruction is
generated in respect to machine name ?mac and
action ?act"

the variable attribute managing means 28 generates an interpolation program synthesis goal INTER-GOAL-1 (32 in FIG. 2) as follows:

"Machine name: Pinch roll open/close device
Action: Open
Kind of generated program: Momentary drive instruction is converted to latch drive instruction"

The variable attribute managing means 28 sends this to the program generating means 24 and requests generation of an interpolation program.

The program generating means 24 generates definition conditions representing the following definition conditions REQ-2 (31b in FIG. 2) of the variable attributes when the variable name required for generating the interpolation program corresponding to the interpolation program synthesis goal INTER-GOAL-1 is present:

"REQ-2
Pinch roll open/close device
Open
Latch
Drive instruction
Definition:

and sends the definition conditions to the variable attribute managing means 28. The variable attribute managing means 28 generates through the variable name generating means 25 a variable having the following meanings:

"Pinch roll open/close device
Open
Latch
Drive instruction"

and this variable name 41 and the variable attribute are stored in the variable attribute memory means 26. This variable name is sent back to the program generating means. That is, the variable attribute memory means 26 generates, e.g., a variable name POCOPL 42 as a finally defined variable name, and the variable attribute managing means 28 sends this variable name to the program generating means 24 as RES-2 (34b in FIG. 2).

Upon reception of the finally defined variable as RES-2, the program generating means 24 generates an interpolation program INTER-PROGRAM-1 (33 in FIG. 2) having the following content and sends it back to the variable attribute managing means 28:

"{(and:(or:POCOPN POCOPL)(not:POCCLS))
→ (on:POCOPL)}

The variable attribute managing means 28 sends back to the program generating means 24 the content of this program INTER-PROGRAM-1 as a response RES-1 (34a in FIG. 2) to the definition/retrieval conditions REQ-1 (31a in FIG. 2) of the variable attributes.

The program generating means 24 and the variable attribute managing means 28 repeat the above processing to sequentially determine variable names used in a partial program to be generated, and generate a plurality of partial programs PROGRAM-001 (30a in FIG. 4) corresponding to the program synthesis goal GOAL-001.

The above embodiment includes the interpolation program synthesis rule memory means 27. In synthesis of the variables or constant names used in a plurality of partial programs to obtain a synthetic program, when a variable name having exactly the same meaning as the definition/retrieval conditions of the variable attributes cannot be retrieved, an interpolation program synthesis goal can be generated with reference to the interpolation program synthesis rule of the interpolation program synthesis rule memory means 27 on the basis of the meaning of a desired variable. An interpolation program for defining the desired variable can be automatically generated by using other variable on the basis of this interpolation program generation goal. Therefore, the designer need not generate the interpolation program. Therefore, programming efficiency can be greatly improved.

In the above embodiment, the plant control system is the target system. However, the present invention is not limited thereto. Various similar signals can be used when a desired variable name cannot be retrieved.

Additional advantages and modifications will readily occur to those skilled in the art. Therefore, the invention in its broader aspects is not limited to the specific details and representative devices, shown and described. Accordingly, various modifications may be made without departing from the spirit or scope of the general inventive concept as defined by the appended claims and their equivalents.

What is claimed is:

1. An automatic program synthesizer, comprising:
   program rule memory means for storing a program synthesis rule;
   program synthesis goal generating means for generating a program synthesis goal suitable for system specifications of a target system by using the program synthesis rule;

program generating means for generating a retrieval condition on the basis of the program synthesis goal, the retrieval condition being a condition for retrieving variables having the same attribute;

variable attribute memory means for storing a variable name and the variable attribute;

interpolation program synthesis rule memory means for storing an interpolation program synthesis rule for generating an interpolation program; and variable attribute managing means for receiving the retrieval condition from said program generating means and, upon reception of the retrieval condition, for controlling said variable attribute memory means to retrieve a variable name having an attribute coinciding with that of the retrieval condition from said variable attribute memory means and sending a retrieved variable name to said program generating means, said program generating means generating a partial program by using the retrieved variable name, said variable attribute managing means controlling said interpolation program synthesis rule memory means to generate an interpolation program synthesis goal for changing an attribute by using a variable having some different attributes in accordance with the interpolation program synthesis rule stored in said interpolation program synthesis rule memory means and sending the interpolation program synthesis goal to said program generating means when the variable name having the attribute coinciding with that of the retrieval condition cannot be retrieved from said variable attribute memory means, and said program generating means generating the interpolation program by using the interpolation program synthesis goal.

2. An automatic program synthesizer, comprising:

program rule memory means for storing a program synthesis rule;

program synthesis goal generating means for generating a program synthesis goal suitable for system specifications of a target system by using the program synthesis rule;

program generating means for generating a definition/retrieval condition of a variable attribute on the basis of the program synthesis goal, the definition/retrieval condition being a definition condition for defining an attribute of a variable (including a constant) or a retrieval condition for retrieving variables having the same attribute;

variable name generating means for generating a variable name;

variable attribute memory means for storing the variable name and the variable attribute;

interpolation program synthesis rule memory means for storing an interpolation program synthesis rule for generating an interpolation program; and variable attribute managing means for receiving the definition/retrieval condition of the variable attribute from said program generating means for controlling said variable name generating means to generate a variable name coinciding with that of the definition condition and store the variable name coinciding with that of the definition condition and an attribute given as the definition condition in said variable attribute memory means when the definition/retrieval condition of the variable attribute is the definition condition, and for controlling said variable attribute memory means to retrieve a variable name having an attribute coinciding with that of the retrieval condition from said variable attribute memory means and sending a retrieved variable name to said program generating means when the definition/retrieval condition of the variable attribute is the retrieval condition, said program generating means generating a partial program by using the retrieved variable name, said variable attribute managing means controlling said interpolation program synthesis rule memory means to generate an interpolation program synthesis goal for changing an attribute by using a variable having some different attributes in accordance with the interpolation program synthesis rule stored in said interpolation program synthesis rule memory means and sending the interpolation program synthesis goal to said program generating means when the definition/retrieval condition of the variable attribute is the retrieval condition and the variable name having the attribute coinciding with that of the retrieval condition cannot be retrieved, and said program generating means generating the interpolation program by using the interpolation program synthesis goal.

3. The synthesizer according to claim 2, wherein said variable attribute managing means determines a kind of the definition/retrieval condition of the variable attribute received from said program generating means and outputs the definition condition or the retrieval condition.

4. The synthesizer according to claim 2, wherein said program generating means generates a second definition/retrieval condition of a variable attribute upon reception of the interpolation program synthesis goal from said variable attribute managing means, sends the second definition/retrieval condition to said variable attribute managing means, and receives a second variable name from said variable attribute managing means.

5. The synthesizer according to claim 4, wherein said program generating means generates the partial program on the basis of the variable name and the second variable name.

6. The synthesizer according to claim 2, wherein said program generating means generates the partial program on the basis of the variable name.

* * * * *